United States Patent [19]

Mateev et al.

[11] 4,306,852
[45] Dec. 22, 1981

[54] SPRUELESS PLASTIC MATERIAL INJECTION MOLDING INJECTION APPARATUS

[75] Inventors: Evgeni H. Mateev; Tzvetan P. Krestev, both of Pleven, Bulgaria

[73] Assignee: Nipki po Technologia na Materialite, Sofia, Bulgaria

[21] Appl. No.: 147,290

[22] Filed: May 6, 1980

[30] Foreign Application Priority Data

May 7, 1979 [BG] Bulgaria .................................. 43474

[51] Int. Cl.³ ............................ B29F 1/03; B29F 1/08
[52] U.S. Cl. .............................. 425/549; 264/328.15; 425/564; 425/566
[58] Field of Search ....................... 425/549, 564, 566; 264/328.15

[56] References Cited

U.S. PATENT DOCUMENTS 3,461,498  8/1969  Ramaika .................... 425/568 X
3,590,439  7/1971  Swanson .................... 425/564 X

*Primary Examiner*—Thomas P. Pavelko

[57] ABSTRACT

Apparatus for the sprueless injection molding of parts from polymers. The apparatus includes an injection mold having a part-forming cavity, and an injection nozzle having a front end cooperating with the mold. A selectively operated closing valve is disposed in the nozzle, the valve having a movable valve member with a valve seat thereon cooperating with a valve seat on the nozzle body. A gate channel or passage is disposed between the valve seat on the body of the nozzle and the inlet opening of the mold cavity. The movable valve member has an elongated forward end portion which is telescoped within the gate passage, the forward end portion sealingly engaging the wall of the gate passage when the valve member is in its forward, closed position, the forward end surface of the elongated forward end portion of the valve member facing the mold cavity lying substantially flush with the wall of the mold when the valve member is in its forward, valve-closed position. The diameter of the forward end surface of the elongated forward end portion of the valve member is less than the smallest diameter of the seats of the closing valve.

7 Claims, 2 Drawing Figures

SPRUELESS PLASTIC MATERIAL INJECTION MOLDING INJECTION APPARATUS

This invention relates to a sprueless injection molding apparatus for manufacturing parts from polymers. The apparatus of the invention is particularly advantageous in the molding of parts which require use of a large diameter closing valve.

An apparatus for injection molding without a sprue is known. Such apparatus includes an injection mold, a nozzle, and a closing valve which is disposed in the nozzle so as to be connected to the cavity of the injection mold via a hot channel along an axis in which the closing valve is disposed with its surface sidewise to the polymer melt and facing the surface of the valve seat and the surface of the molded part in the mold cavity.

The main disadvantage of such prior device is the complexity of the technological process, due to the necessity of strict control of the molding process in order to avoid the setting of the plastic material melt in the hot gate channel. One other disadvantage of such prior apparatus is the small diameter of the closing valve which is necessary. Increasing the diameter of the closing valve is limited due to the improper cooling of the surface of the molded part in the area of the valve. As a result, when injection molding is used for forming foaming thermoplastics, when large diameter closing valves are a necessity, no molding apparatus without a sprue is employed.

The object of the present invention is to be provide an injection molding apparatus without a sprue for molding parts from polymeric materials, which permits the sprueless automated production of molded parts which require a large diameter closing valve, and which reduces the time for filling the mold cavity with plastic material.

The above objects of the invention are accomplished by the apparatus of the invention, which comprises an injection mold and a nozzle including a closing valve, between the cooperating valve seat surfaces of the closing valve and the molded part there being interposed a cold gate channel in which there is disposed an elongated forward part of the movable member of the closing valve. When the closing valve is in its closed position, the elongated part is placed sidewardly from the walls of the mold channel, the elongated forward part of the movable valve member being disposed generally normal to a surface of the part molded in the mold cavity. The diameter of the forward end surface of the elongated part is smaller than the smallest diameter of the cooperating seats of the valve.

An advantage of the apparatus of the invention is that it permits molding without a sprue when the diameter of the closing valve is large, and that is presents the opportunity for the sprueless automated production of large parts, and improves the structural homogeneity and quality of such parts. When producing parts from partially foaming thermoplastics, which have a foamy inside and a hard crust, the apparatus according to the invention is the only possible means for producing parts with an unbroken compact outer crust.

A preferred embodiment of the apparatus in accordance with the invention is shown in the attached drawings, in which.

Figure 1:
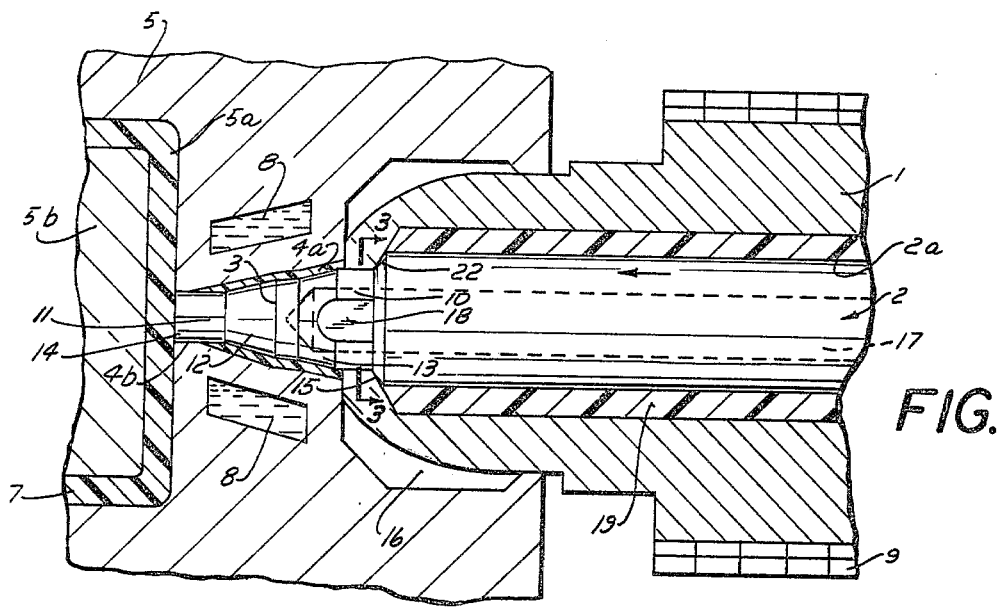
FIG. 1 is a fragmentary view in longitudinal axial section through an injection mold and the nozzle with the valve in closed position.
Figure 2:
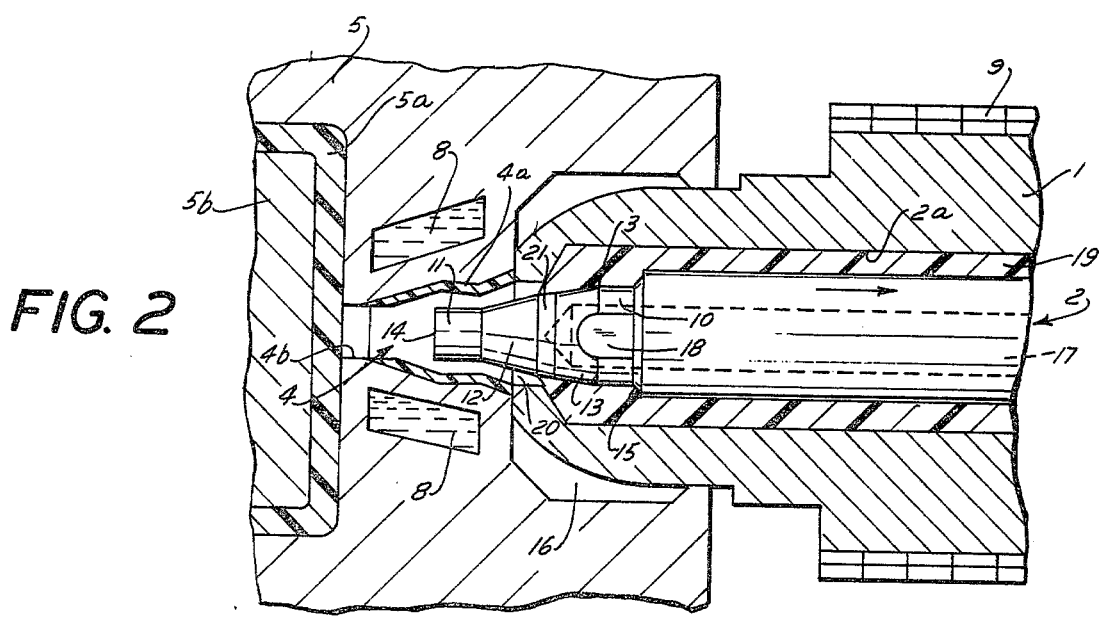
FIG. 2 is a similar view of the injection mold and the nozzle with the valve in open position.

Turning now to the drawings, there is fragmentarily shown the rear end of an injection mold 5 having a cavity 5a therein, there being a core 5b employed with such mold so as to form a hollow article having a broad base. A nozzle 1 cooperates with the mold as shown in FIGS. 1 and 2, the nozzle being heated in the portion thereof at the right in FIGS. 1 and 2 by a band heater 9. A closing valve disposed within the nozzle has a reciprocable valve member 2 disposed axially within a central bore 2a in the nozzle, the main, rear portion of the valve element 2 being of smaller diameter than the bore 2 so as to present an annular passage therebetween, such passage containing polymer melt 19 as it is forwarded by extrusion or injection means (not shown) toward the mold cavity. The valve member 2 has a frusto-conical valve seat 15 thereon at the forward end of the main portion thereof, seat 15 sealingly cooperating with a frusto-conical valve seat 22, disposed adjacent the forward end of the nozzle, when the valve is in closed position as shown in FIG. 1.

In the closed position of the valve, which is shown in FIG. 1, the elongated forward portion of the valve element 2 lies telescoped within a gate 4 in the mold. Gate 4 is made up of a number of sections which generally confront sections 10, 13, 21, and 12 of the elongated forward portion of the movable valve element and are disposed parallel thereto when the valve member 2 is in its valve closed position. The forward end of the gate 4, which lies immediately adjacent the mold cavity 5a, is of circular cylindrical shape and is coaxial with the portion 4a of the gate. Portion 4b of the gate, which is disposed normal to the rearward surface of the part 7 formed in the mold, is of such diameter that it accurately receives and forms a seal with the forward circular cylindrical part 11 on the movable valve element 2. When the valve element is in its valve closed position, as shown in FIG. 1, the forward end surface 14 of part 11 lies flush with, that is in alignment with the outer surface of the molded part 7. Thus, there is no sprue upon the finally molded part 7. Between the mating cooperating surfaces on the gate and valve element there remains only a relatively thin, generally frusto-conical sleeve 4a of congealed polymeric material.

Material 4a is maintained in its hardened, congealed condition during successive injection operations by being cooled by cooling means in form of a channel 8 which surrounds the gates and in the embodiment shown is of frusto-conical shape so that it parallels the gate. A suitable refrigerating material held at low temperature is circulated through the channel 8 by suitable means (not shown).

Figure 3:
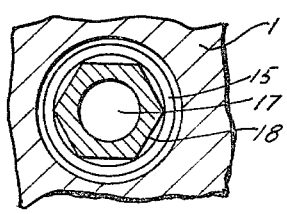
FIG. 3 is a view in cross-section through the valve, the section being taken along the line 3—3 in FIG. 1.

As shown, the injection mold 5 is centered with respect to the outer surface of the forward end of the nozzle 1, is in contact with the forward part of the nozzle, and at the same time is separated from it by an annular channel 16. A central passage 17 extends inwardly of the movable valve element 2 to a forward end thereof disposed within the part 13 of the forward elongated portion of the valve member. The rear portion of the forward elongated member 3 has the external surface thereof provided with flat portions 18 (six shown in FIG. 3) disposed uniformly about the periphery of the part 3. It is to be understood that part 3 could consist of one or more elements in the form of a hyperboloid, a paraboloid etc., but in every case the diameter of its forward end face 14 is smaller than the smallest diameter of the cooperating valve seats 15, 22.

The above-described apparatus according to the invention functions in the following manner: In the closed state of the nozzle 1, as a result of the pressure of the closing valve element 2 toward the valve seats 15, 22 the polymer melt 19, the temperature of which is maintained constant by the heater 9, cannot flow into the cavity 5a of the injection mold 5. At the same time, the elongated part 3 of the closing valve element 2, which cooperate with the walls of the cold gate channel 4, is intensively cooled by the cooling fluid in the channel 8, while the end face 14 of the elongated forward portion of the movable valve member cools the molded part 7 at the place of entry of the polymeric material into the mold cavity. The temperature difference between the valve seats 15, 22 of the closing valve and the face 14 of the elongated part 3 sharply increases due to the intensive heat transfer between the walls of the elongated part 3 and the walls of the cold gate channel 4.

The heat transfer from the polymer melt 19 and the closing valve toward the elongated part 3 of the valve is deterred by the passage 17 extending longitudinally within the movable valve element 2.

After the molded part 7 has cooled and become self-sustaining, it is removed from the mold 5. For molding the next part 7, the valve element 2 together with its elongated part 3 is molded backward (to the right) to the position shown in FIG. 2 in such manner as to allow flow of the polymer melt 19 through the opening 20 between the elongated part 3 and the walls of the cooled gate channel 4 so that such polymer fills the mold cavity 5a. The thin layer 4a of set polymeric material, which forms the walls of the cold gate channel 4, is preserved during injection. Since the injection time is insignificant compared with the total time, for example when molding partially foaming thermoplastics—only a few tenths of a second, the elongated part 3 of the closing valve member 2 remains relatively cool during the injection time and is intensively cooled after the closing of the valve member 2 during the remaining time of the cycle, which is usually from several seconds to minutes. When the valve member 2 is closing, the elongated part 3 forces out the melt 19 which is in the gate channel 4 into the cavity of the mold or forces it back through the passages provided by the relieved portions shown as flatted or chamfered portions 18 on the rear of the elongated portion 3 into the nozzle 1.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. Apparatus for the sprueless injection molding of parts from polymeric plastic material, comprising an injection mold having a cavity therein, a nozzle provided with a closing valve disposed there within for injection plastic material from the forward end of the nozzle into the mold cavity, a gate passage disposed between the front end of the nozzle and the mold cavity, means for cooling the walls of the gate passage to congeal plastic material which remains therein after injection of plastic material into the mold cavity, the closing valve having a valve member which reciprocates within the gate passage toward and away from the mold, the valve member having a first valve seat thereon cooperating with a second valve seat on the nozzle, the valve member having an elongated forward end portion which, when the valve member is in valve closed position engages the walls of the gate passage and which when the valve member is in valve opened position is spaced from the walls of the gate passage to permit the flow of plastic material through the gate passage and along the elongated forward end portion of the valve member, the elongated forward end portion of the valve member having a forward end surface which engages the rear end surface of the molded part in the mold cavity.

2. Apparatus according to claim 1, wherein the diameter of the forward end surface of the elongated forward end portion of the valve member is less than the smallest diameter of either of said two valve seats.

3. Apparatus according to claim 1, wherein the valve member has a longitudinal passage therein which deters the transfer of heat from the plastic material toward the elongated forward end portion of the valve member.

4. Apparatus according to claim 1, wherein the elongated forward end portion of the valve member comprises, in the order named, in the forward direction beginning with the valve seat, a first, generally cylindrical portion, a first forwardly converging frusto-conical portion, a second cylindrical portion, a second forwardly converging frusto-conical portion, and a second cylindrical portion, the said forward end surface of the elongated forward end portion of the valve member being the forward end surface of the second cylindrical portion.

5. Apparatus according to claim 4, wherein the rear end of the mold confronting the forward end of the nozzle has a passage therein through which plastic material is injected into the mold cavity, the passage accurately and sealingly receiving the second cylindrical portion of the elongated forward end portion of the valve member when the valve member is in its forward valve-closed position.

6. Apparatus according to claim 4, wherein the first, generally cylindrical portion of the elongated forward end portion of the valve member has at least one relieved area thereon along which plastic material can flow.

7. Apparatus according to claim 4, wherein the gate passage in the rear portion thereof has corresponding portions of generally the same configuration as but of larger diameter than the following portions of the forward elongated end portion of the valve member; the first, generally cylindrical portion, the first forwardly converging frusto-conical portion, the second cylindrical portion, and the second forwardly converging frusto-conical portion, the above-named portions of the elongated forward end portion of the valve member lying transversely opposite but radially spaced from the corresponding portions of the gate passage when the valve member is in its forward valve-closed position.

* * * * *